United States Patent
Korlepara

(10) Patent No.: US 9,087,004 B2
(45) Date of Patent: Jul. 21, 2015

(54) MAINTAINING A CHANGE MAP OF A BLOCK LEVEL STORAGE DEVICE

(75) Inventor: Pavan Kumar Korlepara, Hyderabad (IN)

(73) Assignee: CA, Inc., New York, NY (US)

( * ) Notice: Subject to any disclaimer, the term of this patent is extended or adjusted under 35 U.S.C. 154(b) by 1777 days.

(21) Appl. No.: 11/426,640

(22) Filed: Jun. 27, 2006

(65) Prior Publication Data

US 2007/0300025 A1    Dec. 27, 2007

(51) Int. Cl.
*G06F 11/14* (2006.01)
*G06F 11/20* (2006.01)
*G06F 3/06* (2006.01)

(52) U.S. Cl.
CPC ............ *G06F 11/1435* (2013.01); *G06F 3/064* (2013.01); *G06F 3/0605* (2013.01); *G06F 3/0689* (2013.01); *G06F 11/1451* (2013.01); *G06F 11/1456* (2013.01); *G06F 11/2071* (2013.01); *G06F 11/2074* (2013.01); *G06F 11/2082* (2013.01)

(58) Field of Classification Search
USPC ........................................... 711/162
See application file for complete search history.

(56) References Cited

U.S. PATENT DOCUMENTS

| | | | | |
|---|---|---|---|---|
| 6,397,229 | B1 * | 5/2002 | Menon et al. | 707/204 |
| 6,574,709 | B1 * | 6/2003 | Skazinski et al. | 711/119 |
| 6,647,474 | B2 * | 11/2003 | Yanai et al. | 711/162 |
| 2006/0036663 | A1 * | 2/2006 | Kwon | 707/206 |

OTHER PUBLICATIONS

Microsoft, ("Computer Disctionary"), Fifth Edition, 2002, p. 15.*
"*VERITAS Storage Replicator for Volume Manager™ 3.1*", Release Notes, Solaris, Copyright © 2000 VERITAS Software Corporation, www.veritas.com, 18 pages, Aug. 11, 2000.
BrightStor Solutions for Microsoft Exchange, "*Data Availability and Storage Management for Microsoft Exchange*", Computer Associates International, Inc., www.ca.com/brightstor, 7 pages, Printed Apr. 2006.

* cited by examiner

*Primary Examiner* — Christopher D Birkhimer
(74) *Attorney, Agent, or Firm* — Baker Botts L.L.P.

(57) ABSTRACT

Maintaining a change map of a block storage device includes intercepting a change message from an application. The change message is intercepted by a change tracking engine. The change message requests a change to a logical block of the block storage device. The change is recorded in a first copy of the change map. The change is recorded the change in a second copy of the change map.

26 Claims, 2 Drawing Sheets

MAINTAINING A CHANGE MAP OF A BLOCK LEVEL STORAGE DEVICE

TECHNICAL FIELD

This invention relates generally to the field of storage systems and more specifically to maintaining a change map of a block level storage device.

BACKGROUND

System administrators typically perform procedures, for example, backups and data replication, in order to maintain a storage system. Although the capacity and complexity of storage systems are growing, the opportunity to perform such administrative procedures is decreasing. Accordingly, system administrators face difficulties completing overall administrative procedures without affecting the performance of the system. As a result, system administrators sometimes perform incremental updates.

According to known techniques for performing incremental updates, changes in storage content are obtained at the application level. These known techniques, however, are application specific and do not scale efficiently. Accordingly, these known techniques are not effective and efficient in certain situations. It is generally desirable to be effective and efficient in certain situations.

SUMMARY OF THE DISCLOSURE

In accordance with the present invention, disadvantages and problems associated with previous techniques for maintaining a change map may be reduced or eliminated.

According to one embodiment of the present invention, maintaining a change map of a block storage device includes intercepting a change message from an application. The change message is intercepted by a change tracking engine. The change message requests a change to a logical block of the block storage device. The change is recorded in a first copy of the change map. The change is recorded the change in a second copy of the change map.

Certain embodiments of the invention may provide one or more technical advantages. A technical advantage of one embodiment may be that multiple copies of a change map may be maintained. Accordingly, if one copy is unusable, for example, is corrupted or incomplete, another copy may be used. Another technical advantage of one embodiment may be that the copies of the change map may be stamped with a counter value. The counter values may be used to select a usable copy of the change map.

Another technical advantage of one embodiment may be that the change map may have a header and a footer. The header and footer may be used to establish whether a copy has been properly stored. Another technical advantage of one embodiment may be that a partial change map may be used. A partial change map may be used in situations where there is not sufficient memory to support a full change map.

Certain embodiments of the invention may include none, some, or all of the above technical advantages. One or more other technical advantages may be readily apparent to one skilled in the art from the figures, descriptions, and claims included herein.

BRIEF DESCRIPTION OF THE DRAWINGS

For a more complete understanding of the present invention and its features and advantages, reference is now made to the following description, taken in conjunction with the accompanying drawings, in which.

DETAILED DESCRIPTION OF THE DRAWINGS

Embodiments of the present invention and its advantages are best understood by referring to FIGS. 1 through 4 of the drawings, like numerals being used for like and corresponding parts of the various drawings.

Figure 1:
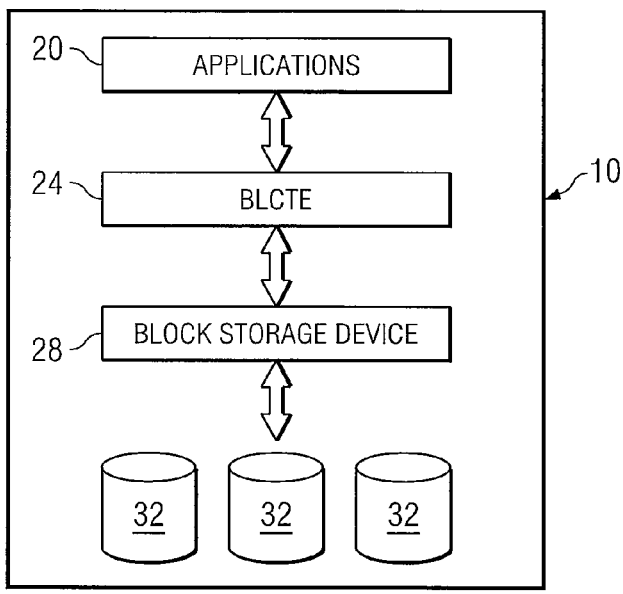
FIG. 1 is a block diagram illustrating one embodiment of a system that includes a block level change tracking engine.

FIG. 1 is a block diagram illustrating one embodiment of a system 10 that includes a block level change tracking engine (BLCTE) 24 that maintains copies of a change map that tracks the changes in a block storage device 28. According to the embodiment, BLCTE 24 stores a plurality of copies of the change map on persistent storage. Accordingly, if one copy is unusable, for example, is corrupted or incomplete, another copy may be used.

According to the embodiment, the copies may be stamped with counter values that may be used to select a usable copy after a system stoppage such as a system crash. In addition, a copy may be updated using a message having a header and a footer, which may be used to establish whether the copy has been properly stored. Moreover, a partial change map may be used in situations where the kernel memory is not sufficient to support a full change map.

System 10 represents any suitable system that uses change tracking at the block level. System 10 includes components such as devices. In general, a device may include any suitable arrangement of components operable to perform the operations of the device. As an example, one or more components of system 10 may include logic, an interface, memory, other component, or any suitable combination of the preceding.

"Logic" may refer to hardware, software, other logic, or any suitable combination of the preceding that may be used to process information according to instructions. Certain logic may manage the operation of a device, and may comprise, for example, a processor. "Processor" may refer to any suitable device operable to execute instructions and manipulate data to perform operations.

"Interface" may refer to logic of a device operable to receive input for the device, send output from the device, perform suitable processing of the input or output or both, or any combination of the preceding, and may comprise one or more ports, conversion software, or both. "Memory" may refer to logic operable to store and facilitate retrieval of information, and may comprise Random Access Memory (RAM), Read Only Memory (ROM), a magnetic drive, a disk drive, a Compact Disk (CD) drive, a Digital Video Disk (DVD) drive, removable media storage, any other suitable data storage medium, or a combination of any of the preceding.

According to the illustrated embodiment, system 10 includes one or more applications 20, BLCTE 24, one or more block storage devices 28, and one or more storage units 28 coupled as shown. According to one embodiment of operation, an application 20 sends system calls to a block storage device 28 through BLCTE 24. As described below, BLCTE 24 may intercept some of the calls.

Applications 20 may represent software or other logic applications. An application 20 may store information in storage units 28 through block storage device 28. Information may refer to data, text, voice, audio, video, multimedia, control, signaling, other information, or any combination of the preceding.

An application 20 may send a change message, such as a change information call, to instruct block storage device 28 to change information stored in storage units 28. As an example, a change information call may refer to a write call, for example, an application write call. A change information call may indicate the change and the location where the change is to be applied. The location of the change may identify a block to which the change applies, which may be given by a target device and an offset value.

BLCTE 24 determines and maintains the geometry of block storage devices 28 that it manages, and may be structured as a kernel module. BLCTE 24 may perform standard geometry input/output controls (IOCTLs) to determine the geometry. According to one embodiment, BLCTE 24 may export a virtual device for each block storage device 28.

BLCTE 24 establishes and records changes of block storage device 28. BLCTE 24 may intercept change information calls from applications 20 to establish the changes. Other calls may be passed through by BLCTE 24.

BLCTE 24 maintains a change map, a data structure that records the changes of block storage device 28. A change map may have any suitable persistence, for example, a change map may be persistent or non-persistent. A persistent change map may be stored in a preconfigured persistent storage that allows BLCTE 24 to recover the change information after a system crash. BLCTE 24 may persist the change map at any suitable time, for example, at every change information call or at periodic intervals.

Change maps may be generated for any suitable units. For example, change maps may be generated per block storage device or per application 20. Moreover, a change map may have any suitable format. As an example, a change map may be a full change map or a partial change map. Examples of full and partial change maps are described in more detail with reference to FIGS. 2A and 2B, respectively.

According to one embodiment, BLCTE 24 maintains a plurality of copies of a change map. If a copy is unusable, another copy may be used. An unusable copy refers to a copy that does not provide an accurate change map. A copy may be unusable if, for example, the copy is corrupted or incomplete. A copy may become corrupted or incomplete in response to, for example, a system crash that occurs while storing the copy. Multiple calls may be needed to store the copy. If a system crash occurs when at least a part of the copy is in flight, the copy may become inconsistent or corrupted.

BLCTE 24 may alternately update the copies of the change map. According one embodiment, BLCTE engine 24 may alternately update a primary copy and a secondary copy. One embodiment of a method for alternately updating copies of a change map is described with reference to FIG. 3.

BLCTE 24 may provide an interface that applications 20 may use to obtain a change map. The interface may use commands such as IOCTL commands. As an example, an application 20 may request a change map in response to a system stoppage. A system stoppage may refer to an event during which system 10 ceases to operate, such as a system crash or a system shutdown.

Block storage device 28 and the associated storage units 32 may comprise any suitable memory. According to one embodiment, block storage device 28 and storage units 32 may comprise a physical disk, a virtual disk, or a logical volume organized using a logical volume manager.

Modifications, additions, or omissions may be made to system 10 without departing from the scope of the invention. The components of system 10 may be integrated or separated according to particular needs. Moreover, the operations of system 10 may be performed by more, fewer, or other modules. For example, the operations of block storage device 28 and storage units 32 may be performed by one module, or the operations of BLCTE 24 may be performed by more than one module. Additionally, operations of system 10 may be performed using any suitable logic. As used in this document, "each" refers to each member of a set or each member of a subset of a set.

Figure 2A:
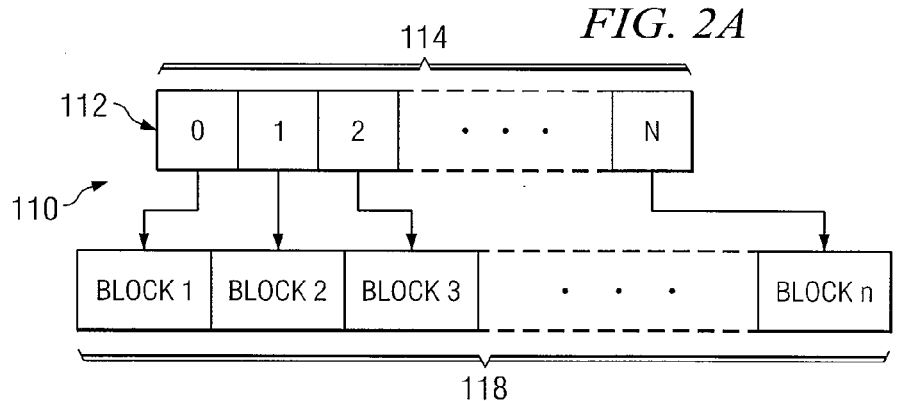
FIG. 2A is a diagram illustrating an example full change map according to one embodiment.

FIG. 2A is a diagram 110 illustrating an example full change map 112 according to one embodiment. Diagram 110 illustrates full change map 112 and a corresponding sequence of n logical blocks 118. Full change map 112 comprises an array of N bits 114, where N=n. According to the illustrated embodiment, each bit 114 corresponds to a logical block 118.

BLCTE 24 maintains full change map 112 by establishing a change for a logical block 118, and recording the change in a bit 114 corresponding to the changed logical block 118. According to one embodiment, BLCTE 24 intercepts a change information call that indicates a change and a logical block 118 to which the change applies. BLCTE 24 then records the change in a bit 114 corresponding to the logical block 118.

Full change map 112 may be used if the granularity, logical block size, and kernel memory are of the appropriate size to store the change map. As an example, if the block size is 100 megabytes and the granularity is 1 megabyte, then the change map is a bit map of 100 bits, where each bit represents a continuous 1 megabyte region.

Modifications, additions, or omissions may be made to change map 112 without departing from the scope of the invention. Change map 112 may include more, fewer, or other fields or values. Additionally, the fields or values may be configured in any suitable arrangement without departing from the scope of the invention.

Figure 2B:
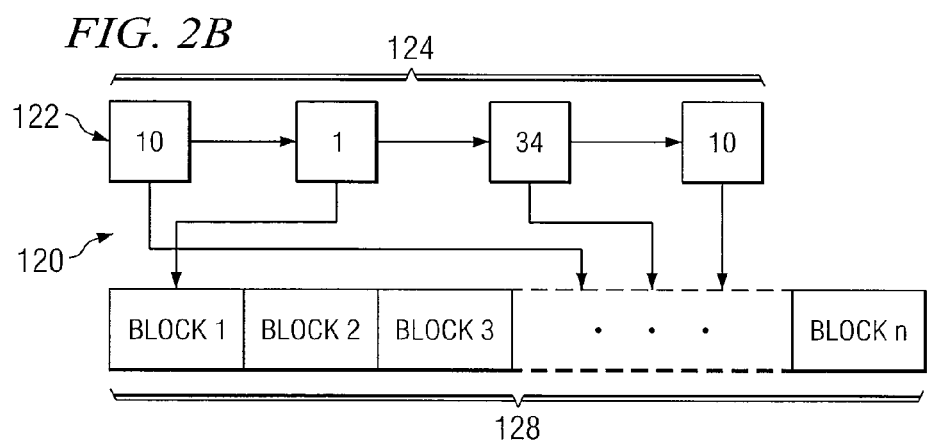
FIG. 2B is a diagram illustrating an example partial change map according to one embodiment.

FIG. 2B is a diagram 120 illustrating an example partial change map 122 according to one embodiment. Diagram 120 illustrates partial change map 122 and a corresponding sequence of logical blocks 128. Full change map 122 comprises a linked list of nodes 124, which may be implemented as a C/C++ data structure. According to the illustrated embodiment, each node 124 corresponds a changed logical block 128.

BLCTE 24 maintains partial change map 122 by adding a node 124 to the linked list as and when a change occurs. Partial chart map 122 may be used to record the sequence of write calls. There may be multiple write calls to the same block 128, so multiple nodes 24 may correspond to the same logical block 128. According to the illustrated example, nodes 10, 34, and 10 correspond to the same logical block 128. According to one embodiment, duplicates may be reduced or eliminated. As an example, the last node of a list corresponding to the same logical block may be maintained, while the other duplicate nodes are removed.

Modifications, additions, or omissions may be made to change map 122 without departing from the scope of the invention. Change map 122 may include more, fewer, or other fields or values. Additionally, the fields or values may be configured in any suitable arrangement without departing from the scope of the invention.

Figure 3:
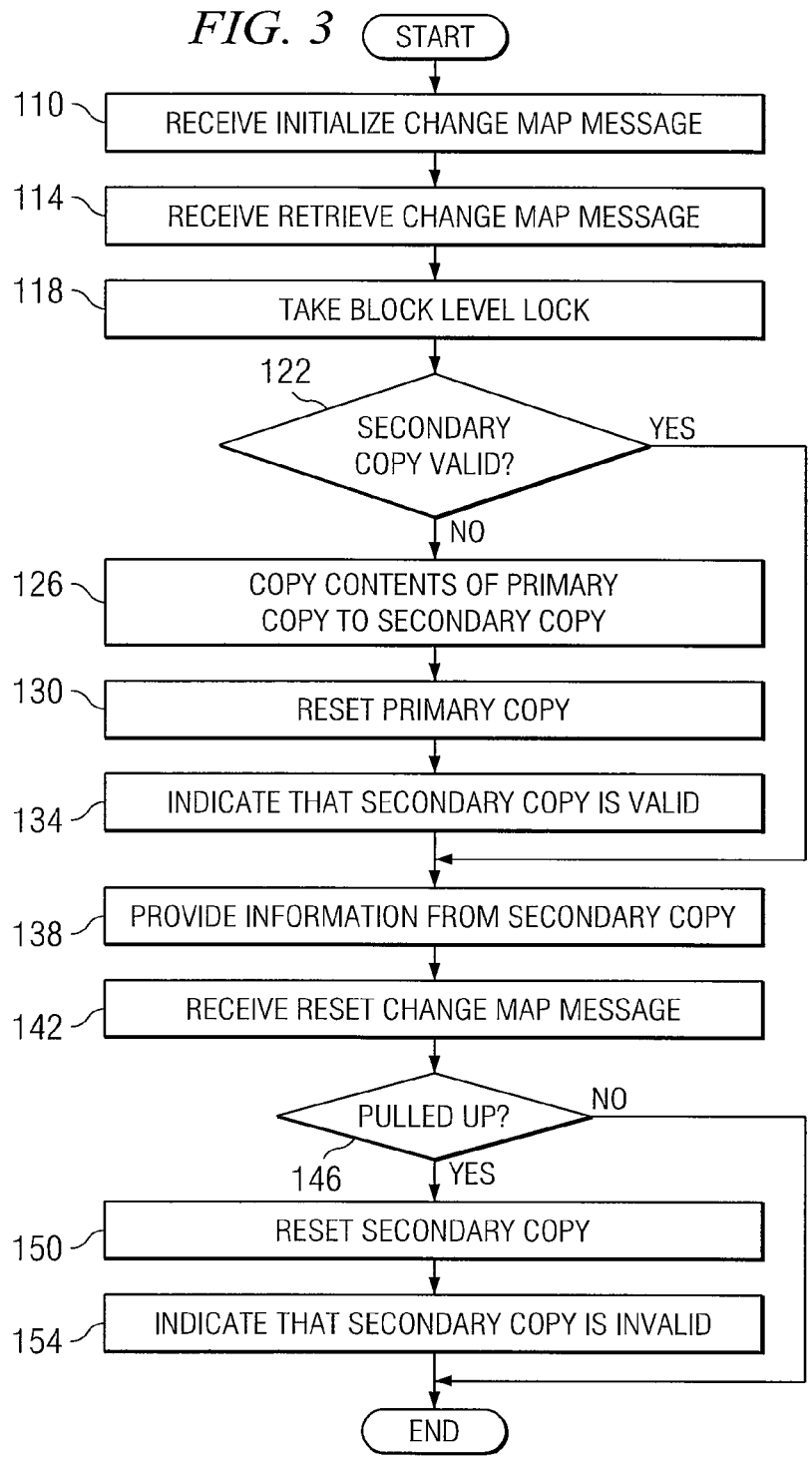
FIG. 3 is a flowchart illustrating one embodiment of a method for maintaining a change map.

FIG. 3 is a flowchart illustrating one embodiment of a method for maintaining a change map. The embodiment may be used with a BLCTE such as BLCTE 24 of FIG. 1. BLCTE 24 may maintain any suitable number of copies of the change map. According to the illustrated embodiment, BLCTE 24 maintains a primary copy and a secondary copy.

The method begins at step 110, where BLCTE 24 receives an initialize change map message from an application 20. The initialize change map message may be used to reset the copies of the change map. A retrieve change map message is received at step 114. In response to the receive change map message, BLCTE 24 takes a block level lock at step 118. As an example, a synchronization object may be locked.

The secondary copy may be valid at step 122. A secondary copy valid flag may be used to indicate whether the secondary copy is valid or invalid. As an example, the secondary copy valid flag may be a Boolean flag, where the flag is set to true to indicate that the secondary copy is valid and is set to false to indicate that the secondary copy is invalid.

If the secondary copy is invalid at step 122, the method proceeds to step 126, where the contents of the primary copy are copied to the secondary copy. The primary copy is reset at step 130 and used for tracking for the next set of changes. The secondary copy is indicated to be valid at step 134. For example, the secondary copy valid flag may be set to true.

If the secondary copy is valid at step 122, BLCTE 24 infers that application 20 is performing a retry to retrieve the change map. As an example, application 20 may perform a retry if application 20 crashed during a previous attempt. Accordingly, BLCTE 24 assumes that the previous secondary copy is needed by application 20, so the primary copy is not copied to the secondary copy. Instead, the method proceeds directly to step 138.

Change map information from the secondary copy is provided to application 20 at step 138. The information describes the changes to the blocks.

A reset change map message is received from application 20 at step 142. The change map information may have been pulled up at step 146. As an example, the change map information may have been pulled up if an incremental backup solution had been persistently prepared. If the change map information has been pulled up at step 146, the method proceeds to step 150, where BLCTE 24 resets the secondary copy. The secondary copy is indicated to be invalid at step 154. For example, the secondary copy valid flag may be set to false. After indicating that the secondary copy is invalid, the method terminates. If the change map information has been pulled up at step 142, the method terminates.

Modifications, additions, or omissions may be made to the method without departing from the scope of the invention. The method may include more, fewer, or other steps. Additionally, steps may be performed in any suitable order without departing from the scope of the invention.

Figure 4:
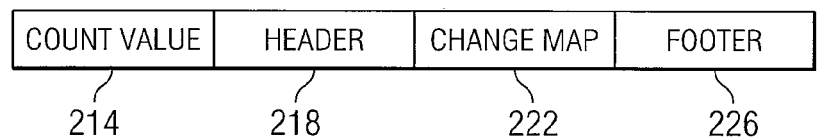
FIG. 4 is a diagram illustrating an example change map format according to one embodiment.

FIG. 4 is a diagram 150 illustrating an example change map format 210 according to one embodiment. Change map format 210 may be used for a message to update a copy of a change map. Change map format 150 includes a count value 214, a header 218, change map a 222, and a footer 226.

Count value 214 records a count value that tracks the updating of the copies. According to one embodiment, a first copy is updated, then a second copy is updated, then the first copy is updated, and so on. Each time a copy is updated, an incremental counter increments a previous count value by a unit value to yield a current count value. Under normal conditions, at any stage the count values of the copies differ by only one unit value. Typically, a larger count value indicates a more recently updated copy. Accordingly, BLCTE 24 may select the copy with the larger count value in response to a system stoppage such as a system shutdown.

Header 218 and footer 226 may each comprise a sequence such as a predefined string or combination of one or more strings and/or one or more numerals. Header 218 and footer 226 may be used to indicate whether a particular copy is usable, for example, after a crash. As an example, an improper header 218 and/or footer 226 may indicate that an update was only partially stored. Header 218 and footer 226 may be considered as improper if, for example, the location of the footer is stored in the header. Accordingly, BLCTE 24 may select the copy with a proper header 218 and footer 226 in response to a system stoppage such as a system crash.

An example header 218 may comprise _CABLCTE_HEADER_$$RELEASE__1__0$$_, and an example footer 226 may comprise _CABLCTE_FOOTER_$$RELEASE__1__0$$_. The example header 218 and example footer 226 may be used to crosscheck the header 218 and footer 226, respectively, on the persistent store to establish if a change map was updated properly. If an exact match is not found, the change map may not have been updated properly, so the other surviving copy may be selected.

According to one embodiment, the response of BLCTE 24 may be determined by the type of system stoppage. If the system stoppage is a system shutdown, BLCTE 24 assumes that the copies were updated consistently. During the next system reboot, BLCTE 24 may select a copy in accordance with the count values. For example, BLCTE 24 may select the copy with the larger counter value.

If the system stoppage is a system crash, BLCTE 24 does not assume that the copies were consistently updated, and that a copy may be incomplete. BLCTE 24 may select a copy in accordance with the count values and the headers 218 and/or footers 226 of the copies. If the counter values of the copies differ by a unit value as expected, but one copy has an improper header 218 and/or footer 226, the other copy is used. If the counter values are not as expected, BLCTE 24 selects the copy with a proper header 218 and footer 226.

Modifications, additions, or omissions may be made to change map format 210 without departing from the scope of the invention. Change map format 210 may include more, fewer, or other fields or values. For example, change map format 210 may include a security value such as a key value. The security value may be used to ensure the recipient of a message that the message was sent by a known sender. Additionally, the fields or values may be configured in any suitable arrangement without departing from the scope of the invention.

Certain embodiments of the invention may provide one or more technical advantages. A technical advantage of one embodiment may be that multiple copies of a change map may be maintained. Accordingly, if one copy is unusable, for example, is corrupted or incomplete, another copy may be used. Another technical advantage of one embodiment may be that the copies of the change map may be stamped with a counter value. The counter values may be used to select a usable copy of the change map.

Another technical advantage of one embodiment may be that the change map may have a header and a footer. The header and footer may be used to establish whether a copy has been properly stored. Another technical advantage of one embodiment may be that a partial change map may be used. A partial change map may be used in situations where there is not sufficient memory to support a full change map.

While this disclosure has been described in terms of certain embodiments and generally associated methods, alterations and permutations of the embodiments and methods will be apparent to those skilled in the art. Accordingly, the above description of example embodiments does not constrain this disclosure. Other changes, substitutions, and alterations are also possible without departing from the spirit and scope of this disclosure, as defined by the following claims.

What is claimed is:

1. A method for maintaining a change map of a block storage device, comprising:
intercepting a change message from an application, the change message intercepted by a change tracking engine, the change message requesting a change to a logical block of a plurality of logical blocks of a block storage device;
recording the change in a first copy of a plurality of copies of a change map by adding a node corresponding to and recording the change of the logical block to a linked list, the added node linked to a previous node also corresponding to the logical block and added to the linked list to record a previous change of the logical block, the change recorded using a first message comprising a first header indicating whether the first copy provides an accurate change map of the block storage device;
removing the previous node from the linked list; and
recording the change in a second copy of the plurality of copies of the change map, the change recorded using a second message comprising a second header indicating whether the second copy provides an accurate change map of the block storage device.

2. The method of claim 1, wherein:
recording the change in the first copy of the plurality of copies of the change map further comprises:
recording the change in the first copy; and
recording the change in the second copy of the plurality of copies of the change map further comprises:
copying the change from the first copy to the second copy.

3. The method of claim 1, further comprising:
receiving a request for the change map from the application; and
providing the second copy of the change map to the application in response to the request for the change map.

4. The method of claim 1, wherein:
recording the change in the first copy of the plurality of copies of the change map further comprises:
stamping the first copy with a first counter value; and
recording the change in the second copy of the plurality of copies of the change map further comprises:
stamping the second copy with a second counter value, the difference between the first counter value and the second counter value being a unit value.

5. The method of claim 4, further comprising:
detecting a system stoppage;
selecting at least one of the first copy or the second copy in accordance with the first count value and the second count value; and
providing the selected copy to the application.

6. The method of claim 1, wherein:
recording the change in the first copy of the plurality of copies of the change map further comprises:
recording the change using the first message comprising a first footer; and
recording the change in the second copy of the plurality of copies of the change map further comprises:
recording the change in the second copy using the second message comprising a second footer.

7. The method of claim 6, further comprising:
detecting a system stoppage; and
selecting at least one of the first copy or the second copy in accordance with the first header, the first footer, the second header, and the second footer; and
providing the selected copy to the application.

8. The method of claim 1, wherein the change map comprises at least one of the following:
a partial change map, a bit of the partial change map corresponding to a changed logical block of the plurality of logical blocks; and
a full change map, a bit of the full change map corresponding to a logical block of the plurality of logical blocks.

9. A change tracking engine for maintaining a change map of a block storage device, comprising:
an interface operable to:
intercept a change message from an application, the change message requesting a change to a logical block of a plurality of logical blocks of a block storage device; and
a processor coupled to the interface and operable to:
record the change in a first copy of a plurality of copies of a change map by adding a node corresponding to and recording the change of the logical block to a linked list, the added node linked to a previous node also corresponding to the logical block and added to the linked list to record a previous change of the logical block, the change recorded using a first message comprising a first header indicating whether the first copy provides an accurate change map of the block storage device;
remove the previous node from the linked list; and
record the change in a second copy of the plurality of copies of the change map, the change recorded using a second message comprising a second header indicating whether the second copy provides an accurate change map of the block storage device.

10. The change tracking engine of claim 9, wherein the processor is further operable to:
record the change in the first copy of the plurality of copies of the change map by:
recording the change in the first copy; and
record the change in the second copy of the plurality of copies of the change map by:
copying the change from the first copy to the second copy.

11. The change tracking engine of claim 9, wherein:
the interface is further operable to:
receive a request for the change map from the application; and
the processor is further operable to:
provide the second copy of the change map to the application in response to the request for the change map.

12. The change tracking engine of claim 9, wherein the processor is further operable to:
record the change in the first copy of the plurality of copies of the change map by:
stamping the first copy with a first counter value; and
record the change in the second copy of the plurality of copies of the change map by:
stamping the second copy with a second counter value, the difference between the first counter value and the second counter value being a unit value.

13. The change tracking engine of claim 12, wherein the processor is further operable to:
- detect a system stoppage;
- select at least one of the first copy or the second copy in accordance with the first count value and the second count value; and
- provide the selected copy to the application.

14. The change tracking engine of claim 9, wherein the processor is further operable to:
- record the change in the first copy of the plurality of copies of the change map by:
  - recording the change using the first message comprising a first footer; and
- record the change in the second copy of the plurality of copies of the change map by:
  - recording the change in the second copy using the second message comprising a second footer.

15. The change tracking engine of claim 14, wherein the processor is further operable to:
- detect a system stoppage; and
- select at least one of the first copy or the second copy in accordance with the first header, the first footer, the second header, and the second footer; and
- provide the selected copy to the application.

16. The change tracking engine of claim 9, wherein the change map comprises at least one of the following:
- a partial change map, a bit of the partial change map corresponding to a changed logical block of the plurality of logical blocks; and
- a full change map, a bit of the full change map corresponding to a logical block of the plurality of logical blocks.

17. Logic for maintaining a change map of a block storage device, the logic embodied in a data storage medium and operable to:
- intercept a change message from an application, the change message intercepted by a change tracking engine, the change message requesting a change to a logical block of a plurality of logical blocks of a block storage device;
- record the change in a first copy of a plurality of copies of a change map by adding a node corresponding to and recording the change of the logical block to a linked list, the added node linked to a previous node also corresponding to the logical block and added to the linked list to record a previous change of the logical block, the change recorded using a first message comprising a first header indicating whether the first copy provides an accurate change map of the block storage device;
- remove the previous node from the linked list; and
- record the change in a second copy of the plurality of copies of the change map, the change recorded using a second message comprising a second header indicating whether the second copy provides an accurate change map of the block storage device.

18. The logic of claim 17, further operable to:
- record the change in the first copy of the plurality of copies of the change map by:
  - recording the change in the first copy; and
- record the change in the second copy of the plurality of copies of the change map by:
  - copying the change from the first copy to the second copy.

19. The logic of claim 17, further operable to:
- receive a request for the change map from the application; and
- provide the second copy of the change map to the application in response to the request for the change map.

20. The logic of claim 17, further operable to:
- record the change in the first copy of the plurality of copies of the change map by:
  - stamping the first copy with a first counter value; and
- record the change in the second copy of the plurality of copies of the change map by:
  - stamping the second copy with a second counter value, the difference between the first counter value and the second counter value being a unit value.

21. The logic of claim 20, further operable to:
- detect a system stoppage;
- select at least one of the first copy or the second copy in accordance with the first count value and the second count value; and
- provide the selected copy to the application.

22. The logic of claim 17, further operable to:
- record the change in the first copy of the plurality of copies of the change map by:
  - recording the change using the first message comprising a first footer; and
- record the change in the second copy of the plurality of copies of the change map by:
  - recording the change in the second copy using the second message comprising a second footer.

23. The logic of claim 22, further operable to:
- detect a system stoppage; and
- select at least one of the first copy or the second copy in accordance with the first header, the first footer, the second header, and the second footer; and
- provide the selected copy to the application.

24. The logic of claim 17, wherein the change map comprises at least one of the following:
- a partial change map, a bit of the partial change map corresponding to a changed logical block of the plurality of logical blocks; and
- a full change map, a bit of the full change map corresponding to a logical block of the plurality of logical blocks.

25. A system for maintaining a change map of a block storage device, comprising a processor configured for:
- intercepting a change message from an application, the change message intercepted by a change tracking engine, the change message requesting a change to a logical block of a plurality of logical blocks of a block storage device;
- recording the change in a first copy of a plurality of copies of a change map by adding a node corresponding to and recording the change of the logical block to a linked list, the added node linked to a previous node also corresponding to the logical block and added to the linked list to record a previous change of the logical block, the change recorded using a first message comprising a first header indicating whether the first copy provides an accurate change map of the block storage device;
- removing the previous node from the linked list; and
- recording the change in a second copy of the plurality of copies of the change map, the change recorded using a second message comprising a second header indicating whether the second copy provides an accurate change map of the block storage device.

26. A method for maintaining a change map of a block storage device, comprising:
- intercepting a change message from an application, the change message intercepted by a change tracking engine, the change message requesting a change to a logical block of a plurality of logical blocks of a block storage device;

recording the change in a first copy of a plurality of copies of a change map, the change recorded in the first copy by:
  adding a node corresponding to and recording the change of the logical block to a linked list, the added node linked to a previous node also corresponding to the logical block and added to the linked list to record a previous change of the logical block;
  recording the change in the first copy using a first message comprising a first header indicating whether the first copy provides an accurate change map of the block storage device and a first footer;
  removing the previous node from the linked list; and
  stamping the first copy with a first counter value;
recording the change in a second copy of the plurality of copies of the change map, the change recorded in the second copy by:
  copying the change from the first copy to the second copy;
  recording the change in the second copy using a second message comprising a second header indicating whether the second copy provides an accurate change map of the block storage device and a second footer; and
  stamping the second copy with a second counter value, the difference between the first counter value and the second counter value being a unit value;
receiving a request for the change map from the application;
providing the second copy of the change map to the application in response to the request for the change map;
detecting a system stoppage;
selecting at least one of the first copy or the second copy in accordance with the first count value, the second count value, the first header, the first footer, the second header, and the second footer; and
providing the selected copy to the application, the change map comprising at least one of the following:
  a partial change map, a bit of the partial change map corresponding to a changed logical block of the plurality of logical blocks; and
  a full change map, a bit of the full change map corresponding to a logical block of the plurality of logical blocks.

* * * * *